US010770895B2

(12) United States Patent
Clarke et al.

(10) Patent No.: US 10,770,895 B2
(45) Date of Patent: Sep. 8, 2020

(54) POWER DISTRIBUTION SYSTEMS

(71) Applicant: GE Energy Power Conversion Technology Ltd., Rugby Warwickshire (GB)

(72) Inventors: Nicholas James Clarke, Loughborough Leicestershire (GB); Stephen Paul Hudson, Rugby Warwickshire (GB)

(73) Assignee: GE Energy Power Conversion Technology Ltd., Rugby Warwickshire (GB)

( * ) Notice: Subject to any disclaimer, the term of this patent is extended or adjusted under 35 U.S.C. 154(b) by 283 days.

(21) Appl. No.: 14/028,780

(22) Filed: Sep. 17, 2013

(65) Prior Publication Data

US 2014/0077607 A1 Mar. 20, 2014

(30) Foreign Application Priority Data

Sep. 17, 2012 (EP) ..................................... 12184692

(51) Int. Cl.
| | | |
|---|---|---|
| *H02J 5/00* | (2016.01) | |
| *H02J 3/00* | (2006.01) | |
| *H02J 4/00* | (2006.01) | |
| *H02J 7/00* | (2006.01) | |

(52) U.S. Cl.
CPC ................ *H02J 3/00* (2013.01); *H02J 3/005* (2013.01); *H02J 4/00* (2013.01); *H02J 7/0045* (2013.01); *Y10T 307/675* (2015.04)

(58) Field of Classification Search
USPC .................. 307/75; 440/3, 6, 49, 84; 702/21
See application file for complete search history.

(56) References Cited

U.S. PATENT DOCUMENTS

| 6,188,591 | B1 | 2/2001 | Ruter et al. | |
|---|---|---|---|---|
| 8,159,082 | B2 * | 4/2012 | Gemin | B63H 21/20 307/64 |
| 8,926,381 | B2 * | 1/2015 | Haugland | B63H 21/20 440/6 |

(Continued)

FOREIGN PATENT DOCUMENTS

| CN | 102598459 A | 7/2012 |
|---|---|---|
| DE | 9301877 U | 3/1994 |

(Continued)

OTHER PUBLICATIONS

EP Search Report issued in connection with corresponding EP Patent Application No. 12184692 dated Feb. 19, 2014.

(Continued)

*Primary Examiner* — Rexford N Barnie
*Assistant Examiner* — Xuan Ly
(74) *Attorney, Agent, or Firm* — Wood IP LLC

(57) ABSTRACT

A power distribution system such as a marine power distribution and propulsion system. The system includes an ac busbar and a plurality of active front end power converters. Each AFE power converter includes a first active rectifier/inverter connected to the busbar and a second active rectifier/inverter connected to an electrical load such as an electric propulsion motor. Power sources are connected to the dc link of the AFE power converters and can be operated under the control of a power management controller or power management system.

15 Claims, 3 Drawing Sheets

(56) References Cited

U.S. PATENT DOCUMENTS

| | | | |
|---|---|---|---|
| 2004/0069251 A1* | 4/2004 | Rzadki | B63G 8/08 |
| | | | 123/3 |
| 2008/0018175 A1 | 1/2008 | McNamara et al. | |
| 2008/0182466 A1 | 7/2008 | Wegner-Donnelly et al. | |
| 2009/0156068 A1* | 6/2009 | Barrett | B63H 21/20 |
| | | | 440/3 |
| 2011/0309677 A1 | 12/2011 | Bourgeau | |
| 2012/0129411 A1 | 5/2012 | Kodera et al. | |
| 2012/0191263 A1 | 7/2012 | Kuniyosi | |

FOREIGN PATENT DOCUMENTS

| | | | |
|---|---|---|---|
| DE | 19739917 A1 | | 3/1999 |
| EP | 2371702 A1 | | 10/2011 |
| EP | 2423103 | * | 2/2012 |
| EP | 2423103 A1 | | 2/2012 |
| EP | 2482425 A1 | | 8/2012 |
| WO | 2006020667 A2 | | 2/2006 |
| WO | 2011154117 A1 | | 12/2011 |
| WO | 2012/049441 A1 | | 4/2012 |
| WO | WO 2012/049441 | * | 4/2012 |

OTHER PUBLICATIONS

European Office Action Issued in connection with corresponding European Application No. 12184692.7 dated Jan. 12, 2016.
Unofficial English Translation of CN Office Action and Search Report issued in connection with corresponding CN Application No. 201310423679.0 dated Aug. 29, 2016.

* cited by examiner

POWER DISTRIBUTION SYSTEMS

TECHNICAL FIELD

Embodiments of the present invention relate to power distribution systems, and in particular to systems that can be used on marine or offshore vessels and which incorporate an additional power source to provide power when the main generators cannot be operated. Such systems can be integrated into conventional marine power distribution and propulsion systems. However, it will be understood that the present invention is not limited to use on marine or offshore vessels and that it is also applicable to land-based power distribution systems, for example.

The term "marine vessels" is intended to include ships, drilling rigs and any other surface-going vessels or platforms or submersible (submarine) vessels.

BACKGROUND ART

Power distribution systems are well known. In a typical arrangement of a marine power distribution and propulsion system shown in FIG. 1 a plurality of ac generators G1-G4 provide ac power to a busbar or switchboard 2 which carries a fixed-frequency distribution voltage such as 690 V, 60 Hz. Each generator G1-G4 is coupled to a prime mover such as a diesel engine D1-D4.

Electric propulsion motors M1-M4 are connected to the busbar 2 by means of interposing power converters 4. The propulsion motors M1-M4 can be of any suitable type and construction and can optionally be configured to drive a propeller shaft or other propulsion system such as a thruster.

In some arrangements, the interposing power converters 4 can be active front end (AFE) power converters. An AFE power converter typically includes a first active rectifier/inverter 6 having ac terminals connected to the busbar 2 and a second active rectifier/inverter 8 having ac terminals connected to the propulsion motor M1-M4. The dc terminals of the first and second active rectifier/inverters 6, 8 are connected together by a dc link 10. A harmonic filter 12 is normally connected to the ac terminals of the first active rectifier/inverter 6, i.e. on the network-side, to ensure harmonic voltages and currents are eliminated. The AFE power converters might, for example, be implemented as MV3000 converters supplied by GE Energy Power Conversion UK Ltd of Boughton Road, Rugby, United Kingdom.

In normal operation, the first active rectifier/inverter 6 will operate as an active rectifier to supply power to the dc link 10 and the second active rectifier/inverter 8 will operate as an inverter to supply power to the associated propulsion motor M1-M4. However, reverse operation can be possible in certain situations such as regenerative braking for the propulsion motors M1-M4. During regenerative braking the propulsion motors M1-M4 generate power which can be fed back to the busbar 2. In this situation the second active/rectifier 8 will operate as an active rectifier to supply the generated power to the dc link 10 and the first active rectifier/inverter 6 will operate as an inverter to supply power to the busbar 2.

Each active rectifier/inverter 6, 8 will typically have a suitable topology with semiconductor power switching devices fully controlled and regulated using a pulse width modulation (PWM) strategy.

The busbar 2 can be equipped with protective switchgear with circuit breakers and associated controls. The busbar 2 will typically be divided into a pair of busbar sections 2a, 2b (e.g. port and starboard) that are interconnected by a tie 14. The actual arrangement of the power distribution system will typically depend on redundancy, which is particularly important for marine vessels.

The generators G1=G4 and power converters 4 can be connected to the busbar 2 by circuit breakers 16, 18 and associated controls or other switching means.

A conventional power distribution system can have any suitable number and type of generators and any suitable busbar configuration depending on the power generation and distribution requirements.

There are times when it may be for the marine vessel to be able to operate with the main generators G1-G4 off-line. This might include times when the marine vessel is in port or when there is a need to try and minimise the emission of environmentally harmful exhaust gases such as nitrogen oxides (NOx), carbon dioxide (CO2) and other pollutants that are related to the combustion process of the diesel engines D1-D4. There are also times when the generators G1-G4 might be off-line because of a critical fault or for safety reasons. It will therefore be readily appreciated that there is a need for an alternative source of power when the power that would normally be provided by the main generators G1-G4 is unavailable.

SUMMARY OF THE INVENTION

Embodiments of the present invention provide a power distribution system comprising: an ac busbar; a power converter (i.e. an active front end (AFE) power converter) including a first active rectifier/inverter having ac terminals and dc terminals, the ac terminals being connected to the ac busbar, and a second active rectifier/inverter having ac terminals and dc terminals, the ac terminals being connected to an electrical load, the dc terminals of the first and second active rectifier/inverters being connected together by a dc link; and a power source connected to the dc link and operated to selectively provide power to the ac busbar through the first active rectifier/inverter and/or the electrical load through the second active rectifier/inverter.

The present invention further provides a method of operating a power distribution system comprising: an ac busbar; a power converter including a first active rectifier/inverter having ac terminals and dc terminals, the ac terminals being connected to the ac busbar, and a second active rectifier/inverter having ac terminals and dc terminals, the ac terminals being connected to an electrical load, the dc terminals of the first and second active rectifier/inverters being connected together by a dc link; and a power source connected to the dc link; the method including the step of controlling the power source to selectively provide power to the ac busbar through the first active rectifier/inverter and/or the electrical load through the second active rectifier/inverter.

The power source provides the power distribution system with an additional dc power supply, or alternatively with an additional ac power supply provided the power source is connected to the dc link by means of a suitable AC/DC power converter. Such an additional power supply can be used to selectively provide power to the power distribution system when the main power supply (e.g. generators that provide power to the busbar) is not available for any reason.

In practice, any suitable power source can be used. In one embodiment the power source is only capable of generating and exporting power into the power distribution system and can be an energy generating device such as a fuel cell or a device that can extract energy from renewable sources like wind, wave or tide flows, solar etc. For example, the power source can be a wind turbine, a subsea turbine, a wave generator or a photovoltaic collector. The power source can also be an auxiliary generator with an associated prime mover (e.g. a diesel engine or turbine). Such an auxiliary generator can provide a dc output or an ac output, it being understood that in the latter case the auxiliary generator will be connected to the dc link by means of a suitable AC/DC power converter. The power source is capable of being charged by the power distribution system as well as discharging or exporting power into the power distribution system. For example, the power source could be an energy storage and exporting device such as a battery, an ultracapacitor or a supercapacitor which have a very high faradic value and are able to operate at high voltage levels. The energy storage and exporting device can also be a flywheel where the energy is stored mechanically. In this case, the power source can be operated to selectively provide power to the ac busbar through the first active rectifier/inverter and/or the electrical load through the second active rectifier/inverter and to selectively receive power from the ac busbar through the first active rectifier/inverter and/or the electrical load through the second active rectifier/inverter, i.e. for charging and energy storage purposes.

The power distribution system can further include an ac generator connected to the busbar and having an associated prime mover (e.g. a diesel engine, turbine etc.). The power distribution system can have any suitable number and type of generators and associated prime movers, and any suitable busbar configuration, depending on the power generation and distribution requirements. The purpose of the generator(s) is normally to provide the main power source for the power distribution system and the generator(s) will typically be designed to meet the expected operational load requirements.

The busbar can be equipped with protective switchgear with circuit breakers and associated controls, and can be divided into busbar sections.

In the case of a marine power distribution and propulsion system then the electrical load can be a propulsion motor or thruster motor of any suitable type and construction and can optionally be configured to drive a propeller shaft or thruster system. The AFE power converter can be used to control the speed and torque of the propulsion motor or thruster motor in a conventional manner. The electrical load can also be a second ac busbar, e.g. a busbar that is connected to the main ac busbar by means of the AFE power converter and optional transformer, and which might typically carry a lower distribution voltage than the main ac busbar. In this case, power that is discharged into the dc link of the AFE power converter can be provided to one or both of the main ac busbar and the second ac busbar depending on how the first and second active rectifier/inverters of the AFE power converter are enabled. The second ac busbar will typically carry a fixed-frequency distribution voltage to ensure that conventional distribution equipment such as pumps, motors, fans etc. and in appropriate cases, marine vessel services, can be connected to the power distribution system. However, the main ac busbar can optionally carry a variable-frequency distribution voltage. The power distribution system can include electrical switchgear that is adapted for variable-frequency operation. The main ac busbar and second ac busbar can be connected together by the AFE power converter and an optional transformer (e.g. a step-down transformer). In other words, the fixed-frequency distribution voltage can be derived from the variable-frequency distribution voltage that is carried by the main ac busbar by means of the AFE power converter adapted to provide a fixed-frequency output and rated for the distribution equipment.

The power distribution system can have any suitable number of electrical loads, each being connected to the busbar by an associated AFE power converter. The overall power distribution system can therefore include two or more power sources with each power source being connected to the dc link of a respective AFE power converter. This provides the power distribution system with redundancy, which is often of particular importance for marine vessels. Two or more additional power sources can also be connected to the same dc link of a particular AFE power converter, either directly or by means of a suitable interposing power converter. The power distribution system can include a variety of different power sources, including a combination of both additional dc and ac power supplies. The power sources are typically controlled to operate in a coordinated manner. The control of each power source could be integrated into or coordinated with a power management controller or power management system (PMS) for the overall power distribution system. Integrating each power source into the PMS provides another layer of protection for power blackout prevention and can be used for black-starting the power distribution system. The power management controller or PMS can optionally control any of the components of the power distribution system including inter alia the power source(s), interposing power converter(s), isolating switch(es), controller(s) etc. Any suitable control strategy can be used.

Each generator and/or each AFE power converter can be connected to the busbar by circuit breakers and associated controls or other switching means.

A power source defining an additional dc power supply can be connected directly to the dc link of the associated AFE power converter but will typically be connected by means of an interposing DC/DC power converter that provides compatibility between the dc link voltage and the dc terminal voltage of the power source. This allows the dc terminal voltage to be independent of the dc link voltage to the extent permitted by the overall design and allows different types of power sources to be used. If the power source is a battery, an ultracapacitor or a supercapacitor, where voltage output is related to the stored energy, then the availability of the battery capacity can be maximised regardless of its state of charge (SoC) voltage. The DC/DC power converter can be of any suitable type and have any suitable construction, e.g. a buck/boost converter. If the power source is only capable of exporting power into the power distribution system then the DC/DC power converter can be configured for uni-directional power flow. But if the power source is capable of being charged and discharged then the DC/DC power converter must be configured for bi-directional power flow. A power source defining an additional ac power supply must be connected to the dc link of the associated AFE power converter by means of an interposing AC/DC power converter that provides compatibility between the dc link voltage and the ac terminal voltage of the power source. The AC/DC power converter can be of any suitable type and have any suitable construction.

Connecting the power source to the dc link of the AFE power converter avoids any direct connection into the main ac busbar or switchboard—no additional switchboard cubicles are needed. This is particularly useful on retro-fit applications where the power source and its associated components are integrated into an existing power distribution system. It also means that the protection and fault clearance strategies that are applied to the busbar are not affected or restricted. It is expected that the power source and its associated components such as the interposing power converter will have high impedance in comparison to the generators during short circuit fault conditions.

Each AFE power converter will typically include its own controller to control the operation of the active rectifier/inverters. Any interposing power DC/DC or AC/DC power converter that is used to connect the power source to the dc link of the AFE power converter will typically also include its own controller.

Each power source will typically also include its own controller. In addition to controlling the charging/discharging of the power source, the controller can sometimes also control or monitor other operating parameters such as temperature, storage capacity etc. and provide safety override capability to disconnect or shutdown the power source in the event of a fault, for example. The controller can optionally interface with external equipment for monitoring purposes or remote control of the power source. All controllers can be interfaced to the overall power management controller or PMS and optionally to one or more other controllers for a coordinated control strategy, e.g. by means of a local area network (LAN) or internal Ethernet protocol. In other words, two or more of the individual controllers (including the overall power management controller or PMS) can be interfaced or connected together to provide a coordinated response to meet power distribution requirements. It is also possible to integrate the functionality of two or more of the individual controllers on to one physical controller if this provides practical benefits.

In the case where the power source is only capable of exporting power into the power distribution system then it can be controlled to provide one or more of the following power flow modes: (i) power flows only from the power source to the ac busbar, (ii) power flows only from the power source to the electrical load, (iii) power flows from both the ac busbar and the power source to the electrical load, (iv) power flows from both the power source and the electrical load to the ac busbar, and (v) power flows from the power source to both the ac busbar and to the electrical load.

All of the power flow modes that are beneficial to the operation of the power distribution system may be capable of being provided when appropriate.

There are two main operational modes for the power source when exporting power to the power distribution system. It can either be operating in a stand-alone mode where it is the only source of power to the power distribution system (e.g. the generators are off-line) or a combined mode where power is also being provided by the generators or a ship to shore supply, for example. A stand-alone mode would include a situation where power is being supplied to the busbar by another power source through its associated AFE power converter, i.e. where two or more power sources are being operated simultaneously in a stand-alone mode to support other connected electrical loads.

In the stand-alone mode then power can be provided to the busbar through the first active rectifier/inverter of the AFE power converter (mode (i)) so that power can be provided to any other electrical loads that might be connected to the busbar. This might include, for example, any electrical loads connected to a second ac busbar that is connected to the main ac busbar by means of a transformer and/or a power converter. In mode (i) the second active rectifier/inverter of the AFE power converter would not be operational.

Power can also be provided to the electrical load through the second active rectifier/inverter of the AFE power converter (mode (ii)). In mode (ii) the first active rectifier/inverter of the AFE power converter would not be operational. In the case of a marine power distribution and propulsion system then mode (ii) can be useful for marine vessels that use dynamic positioning (DP) systems where the marine vessel is maintained within a particular target area in critical situations, or where there is a requirement to use the power that is supplied by the power source only for the associated propulsion motor or thruster motor. In some arrangements, propulsion power can be provided solely by the power source which removes the need to operate the generators and associated prime movers—allowing for quiet operation or minimising exhaust emissions when the marine vessel is close to port or within certain control areas where NOx taxes are levied, for example.

In the combined mode then power can be provided to the electrical load from both the busbar and the power source (mode (iii)). This can be useful if there is an increased load demand because it can avoid the need to initiate the starting, synchronisation and loading of an additional generator, or can provide additional power to the electrical load on a temporary basis until an additional generator can be brought on-line. It can also allow the power distribution system to meet increased load demands while allowing the prime movers to operate at optimum output efficiency. In the case of a marine power distribution and propulsion system then mode (iii) can be useful for marine vessels with large but short-term power requirements, e.g. anchor handlers. The power source can provide 'peak lopping' to meet the short-term power requirements under anchor handling operations whilst the main generators are only required to meet the steady-state power requirements of the vessel.

Power can also be provided from both the power source and the electrical load to the busbar (mode (iv)). It will be readily appreciated that this mode requires power to be provided by the electrical load. In the case of a marine power distribution and propulsion system where the electrical load is a propulsion motor or thruster motor then power can be regenerated back to the busbar from the propulsion motor or thruster motor when it is braking. Additional power can be provided to the busbar from the power source if this is needed for any other electrical loads that might be connected to the busbar.

Power can also be provided from the power source to both the busbar and the electrical load (mode (v)).

In the case where the power source is also capable of being charged by the power distribution system then it can be controlled to provide one or more of the following power flow modes: (i) power flows only from the power source to the ac busbar, (ii) power flows only from the power source to the electrical load, (iii) power flows from both the ac busbar and the power source to the electrical load, (iv) power flows from both the power source and the electrical load to the ac busbar, (v) power flows from the power source to both the ac busbar and to the electrical load, (vi) power flows only from the ac busbar to the power source, (vii) power flows only from the electrical load to the power source, (viii) power flow from the ac busbar to both the electrical load and the power source, (ix) power flows from the electrical load to both the ac busbar and the power source, and (x) power flows from both the ac busbar and the electrical load to the power source.

All of the power flow modes that are beneficial to the operation of the power distribution system may be capable of being provided when appropriate.

Modes (i) to (v) are as described above and are used when the power source is discharging or exporting power into the power distribution system in either of the stand-alone or combined modes. Modes (vi) to (x) are used when the power source is being charged by the power distribution system.

Power can flow only from the busbar to the power source through the first active rectifier/inverter of the AFE power converter to charge the power source (mode (vi)). In mode (vi) the second active rectifier/inverter of the AFE power converter would not be operational. The power for charging the power source can come from a generator, a ship to shore supply, or even another power source that is connected to the dc link of another AFE power converter, for example. Power can also flow from the busbar to both the electrical load and the power source (mode (viii)) so that the power source is charged at the same time as power is provided to the electrical load.

If power is being provided by the electrical load (e.g. power is being regenerated by the propulsion motor or thruster motor when it is braking) then it can be used only to charge the power source through the second active rectifier inverter of the AFE power converter (mode (vii)). In mode (vii) the first active rectifier/inverter of the AFE power converter would not be operational. The power source can be charged by the electrical load while power is regenerated back to the busbar (mode (ix)) or while power flows from the busbar (mode x), i.e. where the power source is charged by both the busbar and the electrical load at the same time.

It will be readily appreciated that the power source can also be disconnected from the dc link or disabled so that power flows between the busbar and the electrical load through the AFE power converter in a conventional manner (modes (xi) and (xii)).

The various operational and/or power flow modes can be selected by the power management controller or PMS and implemented by the individual controllers. For example, the controller for the AFE power converter can enable and disable the first and second active rectifier/inverters of the AFE power converter and control the direction of power flow through them. The controllers for the power source and any interposing DC/DC or AC/DC power converter can control power flow during discharging or charging modes where appropriate. The appropriate active rectifier/inverter of the AFE power converter can be enabled in the event of a power blackout. Operational and/or power flow modes can optionally also be selected on the basis of a manual input, e.g. by an operator interface.

The various modes are summarised Tables 1 to 3 for a marine power distribution and propulsion system where the electrical load is a propulsion motor or thruster motor. NB is the first active rectifier/inverter or network bridge, MB is the second active rectifier/inverter or motor bridge, PS is the power source, and PC is the interposing power converter. When enabled, a positive (+ve) mode for the network bridge means that power is flowing from the busbar to the dc link and it is operating as an active rectifier and a negative (−ve) mode means that power is flowing from the dc link to the busbar and it is operating as an inverter. A positive mode for the motor bridge means that power is flowing from the dc link to the propulsion motor or thruster motor and it is operating as an inverter and a negative mode means that power is flowing from the motor to the dc link and it is operating as an active rectifier.

It will therefore be readily appreciated that for conventional propulsion operation (mode (xi)) both the network bridge and the motor bridge must be enabled and operating in a positive mode for power to be supplied from the busbar to the propulsion motor or thruster motor. Similarly, for conventional regenerative operation (mode (xii)) then both the network bridge and the motor bridge must be enabled and operating in a negative mode for power to be supplied from the propulsion motor or thruster motor to the busbar. When enabled, a positive mode for the interposing power converter means that power is flowing from the power source to the dc link (discharging or exporting) and a negative mode means that power is flowing from the dc link to the power source (charging).

TABLE 1

Power store discharging

| Mode | NB | MB | PC | Power flow |
|---|---|---|---|---|
| (i) | −ve | Disabled | +ve | (NB)←///(MB)///(Motor) <br> ↑ <br> (PC) <br> ↑ <br> (PS) |
| (ii) | Disabled | +ve | +ve | (NB)///→(MB)→(Motor) <br> ↑ <br> (PC) <br> ↑ <br> (PS) |
| (iii) | +ve | +ve | +ve | (NB)→→(MB)→(Motor) <br> ↑ <br> (PC) <br> ↑ <br> (PS) |
| (iv) | −ve | −ve | +ve | (NB)←←(MB)←(Motor) <br> ↑ <br> (PC) <br> ↑ <br> (PS) |
| (v) | −ve | +ve | +ve | (NB)←→(MB)→(Motor) <br> ↑ <br> (PC) <br> ↑ <br> (PS) |

TABLE 2

Power source charging

| Mode | NB | MB | PC | Power flow |
|---|---|---|---|---|
| (vi) | +ve | Disabled | −ve | (NB)→///(MB)///(Motor) <br> ↓ <br> (PC) <br> ↓ <br> (PS) |
| (vii) | Disabled | −ve | −ve | (NB)///←(MB)←(Motor) <br> ↓ <br> (PC) <br> ↓ <br> (PS) |
| (viii) | +ve | +ve | −ve | (NB)→→(MB)→(Motor) <br> ↓ <br> (PC) <br> ↓ <br> (PS) |
| (ix) | −ve | −ve | −ve | (NB)←←(MB)←(Motor) <br> ↓ <br> (PC) <br> ↓ <br> (PS) |
| (x) | +ve | −ve | −ve | (NB)→←(MB)←(Motor) <br> ↓ <br> (PC) <br> ↓ <br> (PS) |

TABLE 3

| | | | Power source disabled | |
|---|---|---|---|---|
| Mode | NB | MB | PC | Power flow |
| (xi) | +ve | +ve | Disabled | (NB)→→(MB)→(Motor) /// (PC) /// (PS) |
| (xii) | −ve | −ve | Disabled | (NB)←←(MB)←(Motor) /// (PC) /// (PS) |

In the case where the power source is capable of being charged (i.e. it is an energy store such as a battery, an ultracapacitor, a supercapacitor or a flywheel, for example) then the power source can be connected to another power source, either directly or by means of an interposing power converter of any suitable type and construction. In other words, the power source can be connected to both the dc link of the AFE power converter and another power source. This means that the power source can be charged by the other power source in addition to, or in some cases as an alternative to, being charged from the dc link of the AFE power converter. The other power source can be an external power source, e.g. a power source or supply that is outside the main power distribution system and, in the case of a marine power distribution and propulsion system, which is optionally outside the marine vessel itself. The other power source can be a ship to shore supply or an energy generating device of one or more of the types described above, for example. The other power source can provide an ac power supply if the interposing power converter is an AC/DC power converter. It will be readily appreciated that the other power source is not directly connected to the dc link of the AFE power converter and cannot be used to provide power directly to the power distribution system, only to the power source. However, it is possible in other arrangements for an external power source to be connected directly to the dc link, optionally by means of an interposing power converter of any suitable type and construction. This provides a way of supplying power from an external power source to the power distribution system, e.g. from a ship to shore supply when the marine vessel is in port.

The dc link of the AFE power converter may be a reactor-less dc link, i.e. it does not include a reactor.

The connection between the ac terminals of the first active rectifier/inverter and the busbar may be a transformer-less connection (i.e. it does not include a step-down transformer) but one can be provided if necessary.

The power source can be configured so that it can be easily connected to, and disconnected from, the dc link of the AFE power converter. It will be readily appreciated that such physical disconnection is different from simply making the power source non-operational (e.g. by disabling the interposing power converter) when it is not required. The power source can optionally be packaged together with any auxiliary systems or components, e.g. its associated controller(s), power converter(s), isolating switch(es) etc. and components required with the normal safe operation of the power source itself such as fans, pumps, control units etc., in a convenient container which is simply connected to the dc link by means of a suitable socket or connector. The container can include a suitable socket or connector that enables the power source so be connected to another power source such as a ship to shore supply, for example. Packaging the power source in this way allows it to be easily and conveniently retro-fitted to existing power distribution systems with an AFE power converter once the dc link has been modified to include a suitable socket or connector. Suitable connecting cables can be used.

DRAWINGS

DETAILED DESCRIPTION OF THE INVENTION

Figure 2:
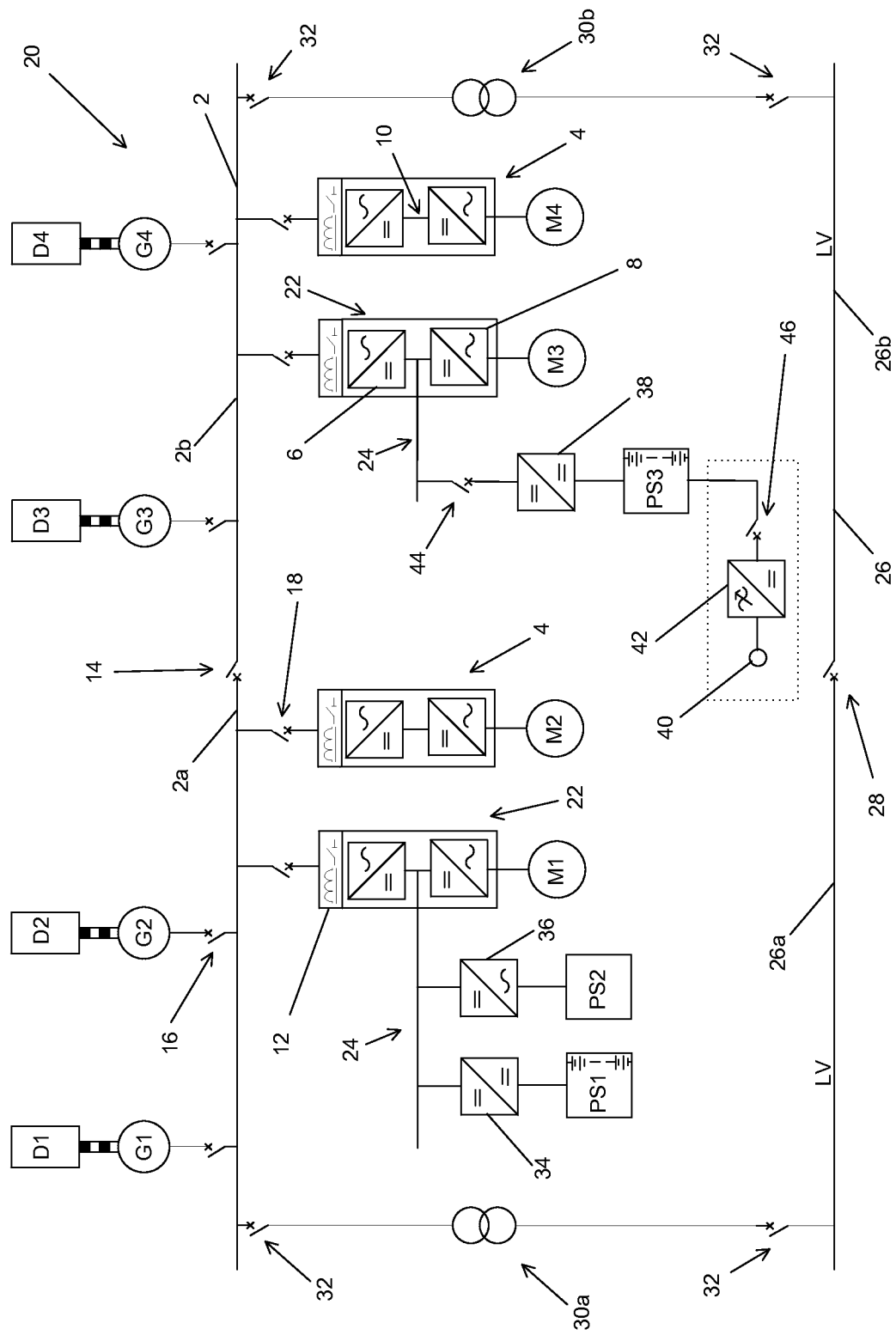
FIG. 2 is a schematic diagram showing a first marine power distribution and propulsion system according to the present invention.

A first marine power distribution and propulsion system 20 according to the present invention is shown in FIG. 2. Although the following description concentrates on systems for marine vessels, it will be readily appreciated that other power distribution systems can be implemented in a similar manner.

Figure 1:
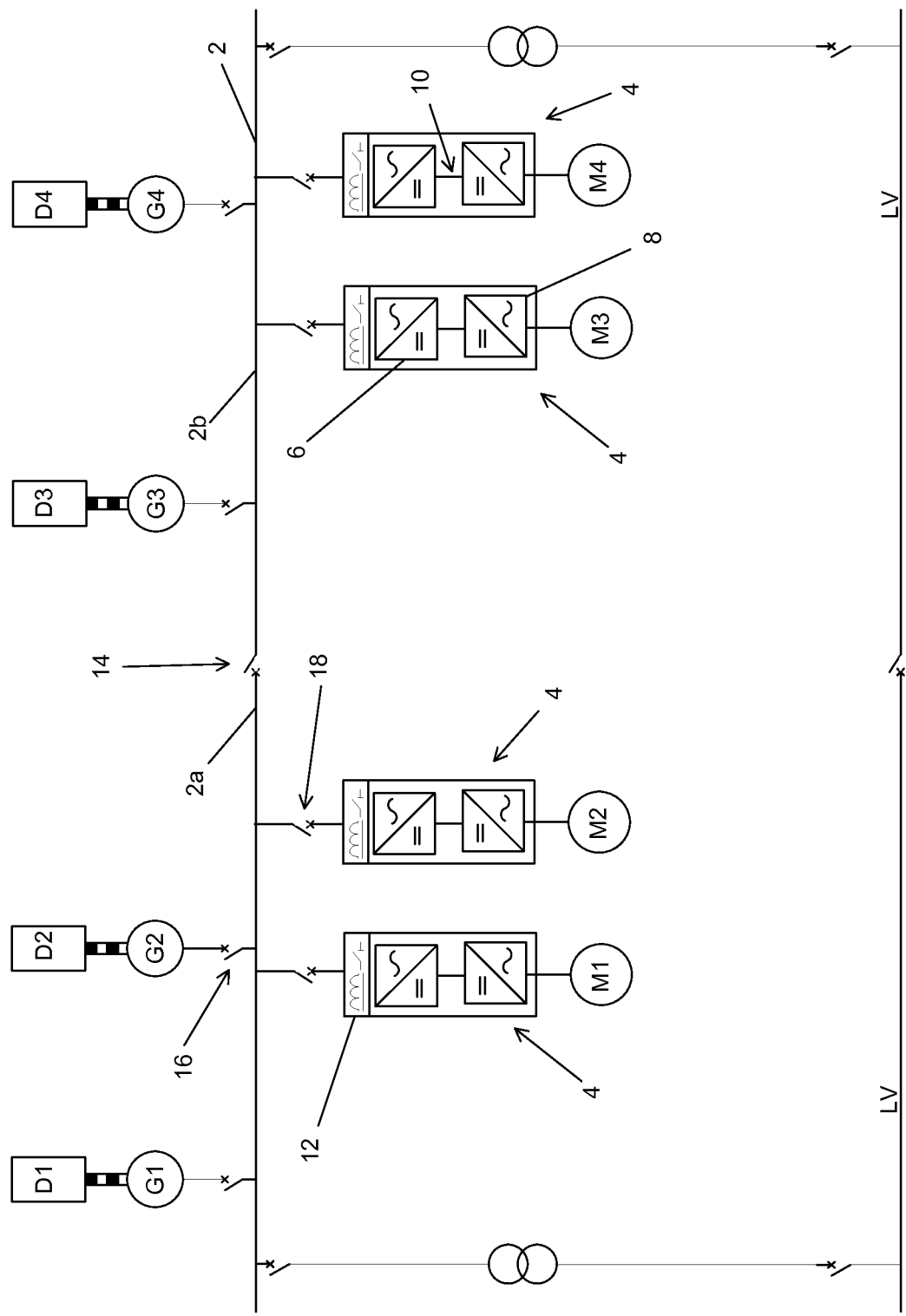
FIG. 1 is a schematic diagram showing a conventional marine power distribution and propulsion system.

The overall marine power distribution and propulsion system 20 is similar to the one shown in FIG. 1 and it will be understood that any suitable number and type of ac generators, propulsion motors etc. can be used. Like components have been given the same labels or reference numerals.

A plurality of ac generators G1-G4 provide ac power to a busbar 2 which carries a fixed-frequency distribution voltage (e.g. 690 V, 60 Hz but other system voltages can be used). The generators G1-G4 are associated with diesel engines D1 . . . D4 but other types of prime mover can be used.

Electric propulsion motors M1-M4 are connected to the busbar 2 by means of interposing active front end (AFE) power converters 4, 22. The propulsion motors M1-M4 can be of any suitable type and construction and can optionally be configured to drive a propeller shaft or other propulsion system such as a thruster. In alternative power distribution systems then other electrical loads might be connected to the AFE power converters.

Each AFE power converter 4, 22 includes a first active rectifier/inverter 6 having ac terminals connected to the busbar 2 and a second active rectifier/inverter 8 having ac terminals connected to the propulsion motor M1 . . . M4. The dc terminals of the first and second active rectifier/inverters 6, 8 are connected together by either a conventional dc link 10 or an extended dc link 24 depending on whether the particular AFE power converter is to be provided with an additional power source. A harmonic filter 12 is connected to the ac terminals of the first active rectifier/inverter 6, i.e. on the network-side, to ensure harmonic voltages and currents are eliminated. The AFE power converters 4, 22 might, for example, be implemented as MV3000 converters supplied by GE Energy Power Conversion UK Ltd of Boughton Road, Rugby, United Kingdom.

In normal operation, the first active rectifier/inverter 6 will operate as an active rectifier to supply power to the dc link 10 or extended dc link 24 and the second active rectifier/inverter 8 will operate as an inverter to supply power to the associated propulsion motor M1-M4. However, reverse operation can be possible in certain circumstances such as regenerative braking for the propulsion motors M1-M4. During regenerative braking the propulsion motors M1-M4 generate power which can be fed back to the busbar 2. In this situation the second active/rectifier 8 will operate as an active rectifier to supply the generated power to the dc link 10 and the first active rectifier/inverter 6 will operate as an inverter to supply power to the busbar 2.

Each active rectifier/inverter 6, 8 will typically have a suitable topology with semiconductor power switching devices fully controlled and regulated using a pulse width modulation (PWM) strategy.

The busbar 2 is equipped with protective switchgear with circuit breakers and associated controls. The busbar 2 is divided into a pair of busbars sections 2a, 2b (e.g. port and starboard) that are interconnected by a tie 14. The actual arrangement of the power distribution system will typically depend on redundancy, which is particularly important for marine vessels.

The generators G1-G4 and AFE power converters 4, 22 can be connected to the busbar 2 by circuit breakers 16, 18 and associated controls or other switching means.

A second busbar 26 carries a fixed-frequency distribution voltage (e.g. 480 V, 60 Hz but other system voltage and frequencies can be used). The second busbar 26 is equipped with protective switchgear with circuit breakers and associated controls. The second busbar 26 is divided into a pair of busbar sections 26a, 26b (e.g. port and starboard) that are interconnected by a tie 28. The first busbar sections 2a, 26a are connected together by a first step-down transformer 30a and the second busbar sections 2b, 26b are connected together by a second step-down transformer 30b. The first and second transformers 30a, 30b are connected to the respective busbars by circuit breakers 32 and associated controls or other switching means.

The AFE power converters 22 associated with propulsion motors M1 and M3 have extended dc links 24. First and second power sources PS1, PS2 are connected in parallel to the extended dc link 24 of the AFE power converter associated with propulsion motor M1. A third power source PS3 is connected to the extended dc link 24 of the AFE power converter associated with propulsion motor M3. It will be readily appreciated that the particular arrangement of power sources shown in FIG. 2 is not intended to be a practical implementation and is provided only for the purposes of illustrating the technical features of the present invention. The number and positioning of additional power sources in a practical marine power distribution and propulsion system will depend in the required operating parameters etc.

The first power source PS1 provides an additional dc power supply and is connected to the extended dc link 24 by means of a DC/DC power converter 34. The first power source PS1 can be a battery and is capable of being charged from the extended dc link 24 as well as discharging power into the extended dc link.

The second power source PS2 provides an additional ac power supply and is connected to the extended dc link 24 by means of an AC/DC power converter 36. The second power source PS2 can be an auxiliary ac generator with an associated prime mover such as a diesel engine. It will be readily appreciated that the second power source PS2 is only capable of exporting power to the extended dc link 24 and cannot be charged.

The third power source PS3 provides an additional dc power supply and is connected to the extended dc link 24 by means of a DC/DC power converter 38. The third power source PS3 can be a battery and, like the first power source PS1, is capable of being charged from the extended dc link 24 as well as discharging power into the extended dc link. However, the third power source PS3 is also connected to an external supply or power source 40 such as a ship to shore connection or the like by means of a power converter 42. The power converter 42 can either be a DC/DC or AC/DC power converter depending on the output of the external power source 40. A similar external power source could also be connected to the extended dc link 24, optionally by means of a suitable power converter. In other words, in one arrangement the power converter 42 could be connected to the extended dc link 24 so that power from the external power source 40 is exported directly into the extended dc link instead of being used to charge the third power source PS3.

The DC/DC power converter 38 is connected to the extended dc link 24 by a switch 44 and the power converter 42 is connected to the third power source PS3 by a switch 46. The switch 44 can be opened to isolate the third power source PS3 from the extended dc link 24 when it is being charged by the external power source 40. The switch 46 can be opened to isolate the third power source PS3 from the external power source 40 when it is supplying power to or receiving power from the extended dc link 24.

The power sources PS1-PS3 and their interposing power converters are controlled by individual controllers (not shown) interfaced together and to a power management controller or power management system (PMS) for the marine power distribution and propulsion system. The first power source PS1 and its interposing power converter 34 can be controlled to provide one or more of the power flow modes summarised in Tables 1 and 2 above. For example, power can flow to the first power source PS1 through the extended dc link 24 from one or both of the busbar 2 and the propulsion motor M1 if operating in a regenerative mode to charge the first power source, and power can flow from the first power source PS1 through the extended dc link to one or both of the busbar and the propulsion motor M1. Similarly, the third power source PS3 and its interposing power converter 38 can be controlled to provide one or more of the power flow modes summarised in Tables 1 and 2 above. For example, power can flow through the extended dc link to the third power source PS3 from one or both of the busbar 2 and the propulsion motor M3 if operating in a regenerative mode to charge the third power source, and power can flow from the third power source PS3 through the extended dc link to one or both of the busbar and the propulsion motor M3. The third power source PS3 can also be charged by the external power source 40 through the power converter 42.

The second power source PS2 and its interposing power converter 36 can be controlled to provide one or more of the power flow modes summarised in Table 1 above. For example, power can flow from the second power source PS2 through the extended dc link 24 to one or both of the busbar 2 and the propulsion motor M1.

The power sources PS1-PS3 can be operated simultaneously under the control of the power management controller or PMS.

It will also be readily appreciated that the AFE power converters 22 can be operated in a conventional manner, i.e. where the power sources PS1-PS3 are not operational.

The power sources PS1-PS3 can also be disabled as shown in Table 3 above.

Figure 3:
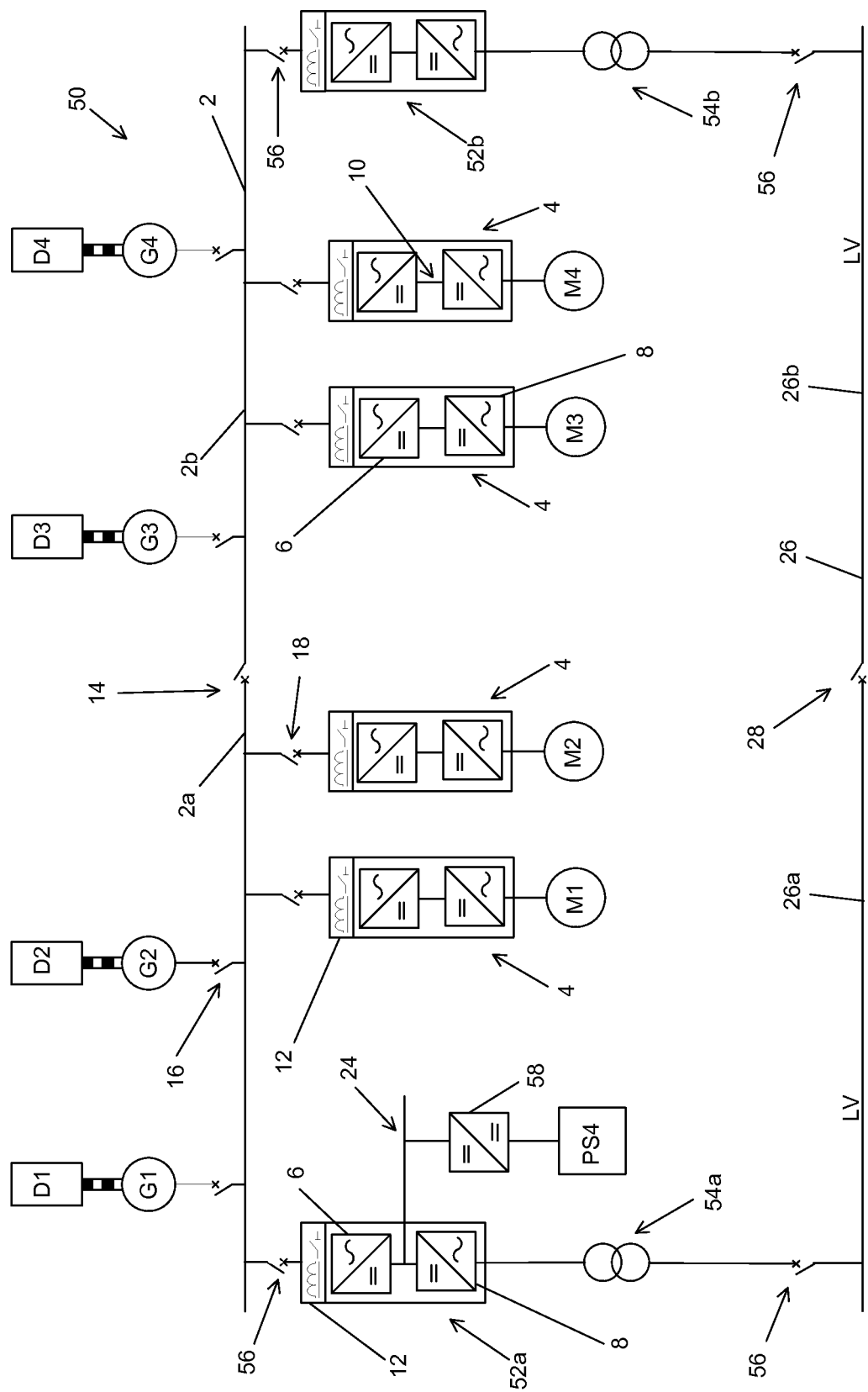
FIG. 3 is a schematic diagram showing a second marine power distribution and propulsion system according to the present invention.

A second marine power distribution and propulsion system 50 according to the present invention is shown in FIG. 3. The third marine power distribution and propulsion system 50 is similar to the one shown in FIG. 2 and like components have been given the same labels or reference numerals.

In this arrangement the busbar 2 carries a variable-frequency distribution voltage (e.g. 690 V but other system voltages can be used). The power management controller or PMS can be adapted to vary the rotational speed of the diesel engines D1-D4 with reference to the electrical load on the busbar 2 such that the ac generators G1-G4 provide a variable frequency output during normal operation of the power distribution system.

The second busbar 26 carries a fixed-frequency distribution voltage (e.g. 480 V, 60 Hz but other system voltage and frequencies can be used).

The first busbar sections 2a, 26a are connected together by a first AFE power converter 52a and a first step-down transformer 54a and the second busbar sections 2b, 26b are connected together by a second AFE power converter 52b and a second step-down transformer 54b. The AFE power converters 52a, 52b and the step-down transformers 54a, 54b are connected to the respective busbar by circuit breakers 56 and associated controls or other switching means.

The first AFE power converter 52a has an extended dc link 24 to which a fourth power source PS4 is connected by means of a DC/DC converter 58. The fourth power source is a battery and defines an additional dc power supply. A fifth power source could also be connected to an extended dc link of the second AFE power converter 52b. Power sources could also be connected to the AFE power converters associated with propulsion motors M1-M4 is provided with an extended dc link as described above. It will be readily appreciated that the particular arrangement of power sources shown in FIG. 3 is not intended to be a practical implementation and is provided only for the purposes of illustrating the technical features of the present invention.

The fourth power source PS4 and its interposing power converter 58 are controlled by individual controllers (not shown) interfaced together and to a power management controller or PMS. The fourth power source PS4 and its interposing power converter 58 can be controlled such that power flows to the fourth power source through the extended dc link 24 from one or both of the busbars 2, 26 to charge the fourth power source and such that power can flow from the fourth power source through the extended dc link to one or both of the busbars 2, 26.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system comprising:
    a plurality of ac generators configured to supply a variable frequency output during normal operation of the power distribution system;
    a main ac busbar configured to receive the variable-frequency distribution voltage from the plurality of ac generators;
    a plurality of first power converters each connected between an electrical load and the main ac busbar;
    a second power converter separately disposed from the plurality of first power converters, and comprising a first active rectifier/inverter comprising ac terminals and dc terminals, the ac terminals being connected to the main ac busbar, and a second active rectifier/inverter comprising ac terminals and dc terminals, the ac terminals of the second active rectifier/inverter being connected to a second ac busbar separately disposed from the main ac busbar, and wherein the dc terminals of the first and second active rectifier/inverters being connected together by a dc link;
    a power source being an alternative dc power source connected to the dc link via an extended dc link, and operated to selectively provide power to the main ac busbar through the first active rectifier/inverter and/or the second ac busbar through the second active rectifier/inverter when outside of the normal operation of the power distribution system; and wherein
    the main ac busbar carries the variable-frequency distribution voltage and the second ac busbar carries a fixed frequency distribution voltage.

2. The power distribution system according to claim 1, wherein the power source is an energy generating device.

3. The power distribution system according to claim 1, wherein the power source is controlled to provide one or more of the following power flow modes:
    (i) power flows only from the power source to the main ac busbar,
    (ii) power flows only from the power source to the second ac busbar,
    (iii) power flows from both the main ac busbar and the power source to the second ac busbar,
    (iv) power flows from both the power source and the second ac busbar to the main ac busbar, and
    (v) power flows from the power source to both the main ac busbar and to the second ac busbar.

4. The power distribution system according to claim 1, wherein the power source is an energy storage and exporting device operated to selectively provide power to the main ac busbar through the first active rectifier/inverter and/or the second ac busbar through the second active rectifier/inverter and to selectively receive power from the main ac busbar through the first active rectifier/inverter and/or the second ac busbar through the second active rectifier/inverter.

5. The power distribution system according to claim 4, wherein the power source is connected to another power source, optionally by a power converter.

6. The power distribution system according to claim 4, wherein the power source is controlled to provide one or more of the following power flow modes:
    (i) power flows only from the power source to the main ac busbar,
    (ii) power flows only from the power source to the second ac busbar,
    (iii) power flows from both the main ac busbar and the power source to the second ac busbar,
    (iv) power flows from both the power source and the second ac busbar to the main ac busbar,
    (v) power flows from the power source to both the main ac busbar and to the second ac busbar,
    (vi) power flows only from the main ac busbar to the power source,
    (vii) power flows only from the second ac busbar to the power source,
    (viii) power flows from the main ac busbar to both the second ac busbar and the power source, (ix) power flows from the second ac busbar to both the main ac busbar and the power source, and (x) power flows from both the main ac busbar and the second ac busbar to the power source.

7. The power distribution system according to claim 6, wherein the power source is connected to another power source, optionally by a power converter.

8. The power distribution system according to claim 1, further comprising a power converter connected between the power source and the dc link.

9. The power distribution system according to claim 1, wherein the dc link does not include a reactor.

10. The power distribution system according to claim 1, wherein the connection between the ac terminals of the first active rectifier/inverter and the main ac busbar does not include a transformer.

11. The power distribution system according to claim 1, further comprising an ac generator connected to the main ac busbar and having an associated prime mover.

12. The power distribution system according to claim 1, wherein the electrical load is a propulsion motor or thruster motor.

13. The power distribution system according to claim 1, wherein the ac terminals of the second active rectifier/inverter are connected to the second ac busbar by a transformer.

14. A method of operating a power distribution system, the method comprising:

supplying a variable-frequency output, via a plurality of ac generators, during normal operation of the power distribution system;

receiving via a main ac busbar, the variable-frequency distribution voltage from the plurality of ac generators;

connecting each first power converter of a plurality of first power converters, between an electrical load and the main ac bus bar;

providing a second power converter separate from the plurality of first power converters and comprising a first active rectifier/inverter comprising ac terminals and dc terminals, the ac terminals being connected to the ac busbar, and a second active rectifier/inverter comprising ac terminals and dc terminals, the ac terminals being connected to a second ac busbar separately disposed from the main ac busbar, and wherein the dc terminals of the first and second active rectifier/inverters being connected together by a dc link;

providing a power source being an alternative dc power source connected to the dc link via an extended dc link; and controlling the power source to selectively provide power to the main ac busbar through the first active rectifier/inverter and/or the second ac busbar through the second active rectifier/inverter when outside of the normal operation of the power distribution system, wherein the main ac busbar carrying the variable-frequency distribution voltage and the second ac busbar carrying a fixed frequency distribution voltage.

15. The method according to claim 14, wherein the power source is an energy storage and exporting device, and wherein the method further comprises:

controlling the power source to selectively receive power from the main ac busbar through the first active rectifier/inverter and/or the second ac busbar through the second active rectifier/inverter.

\* \* \* \* \*